United States Patent
Ye et al.

(10) Patent No.: US 10,798,163 B2
(45) Date of Patent: Oct. 6, 2020

(54) COMMUNICATION TOOL FOR DATA TRANSFER

(71) Applicant: Alibaba Group Holding Limited, George Town (KY)

(72) Inventors: Lingling Ye, Hangzhou (CN); Yanchun Zhu, Hangzhou (CN); Aihui Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 325 days.

(21) Appl. No.: 15/835,160

(22) Filed: Dec. 7, 2017

(65) Prior Publication Data
US 2018/0109608 A1   Apr. 19, 2018

Related U.S. Application Data

(63) Continuation of application No. PCT/CN2016/084605, filed on Jun. 3, 2016.

(30) Foreign Application Priority Data

Jun. 10, 2015  (CN) .......................... 2015 1 0316622

(51) Int. Cl.
*H04L 15/16* (2006.01)
*H04L 29/08* (2006.01)
(Continued)

(52) U.S. Cl.
CPC ......... *H04L 67/1044* (2013.01); *G06Q 30/08* (2013.01); *H04L 51/04* (2013.01);
(Continued)

(58) Field of Classification Search
CPC ... H04L 29/08072; H04L 29/06; H04L 63/20; G06F 21/53
(Continued)

(56) References Cited

U.S. PATENT DOCUMENTS

| 8,190,528 B2 * | 5/2012 | Ginter | G06Q 40/12 705/52 |
| 8,590,056 B2 * | 11/2013 | Ginter | G06Q 40/12 380/231 |

(Continued)

FOREIGN PATENT DOCUMENTS

| CN | 1289981 | 4/2001 |
| CN | 101447060 | 6/2009 |

(Continued)

OTHER PUBLICATIONS

International Search Report issued by International Searching Authority issued in International Application No. PCT/CN2016/084605 dated Aug. 24, 2016; 8 pages.

(Continued)

*Primary Examiner* — Khanh Q Dinh
(74) *Attorney, Agent, or Firm* — Fish & Richardson P.C.

(57) ABSTRACT

An initiation request is received for initiating a service, where the initiation request is generated by a user of a first communication group participating in a communication session. A participation response is received from a plurality of users of the first communication group that defines a second communication group participating in the communication session. A participation result is determined that includes service conditions associated with the user of the first communication group and the plurality of users of the second communication group. In response to determining the participation result, a third communication group is generated that includes target users for completing the service.

20 Claims, 4 Drawing Sheets

(51) Int. Cl.
*H04L 29/06* (2006.01)
*G06Q 30/08* (2012.01)
*H04L 12/58* (2006.01)

(52) U.S. Cl.
CPC ............ *H04L 65/40* (2013.01); *H04L 65/403* (2013.01); *H04L 67/06* (2013.01); *H04L 63/20* (2013.01)

(58) Field of Classification Search
USPC ................ 709/220, 224, 226, 228, 232, 227
See application file for complete search history.

(56) References Cited

U.S. PATENT DOCUMENTS

| | | | | |
|---|---|---|---|---|
| 8,751,793 | B2* | 6/2014 | Ginter | G06F 21/10 380/255 |
| 9,721,086 | B2* | 8/2017 | Shear | G06F 21/445 |
| 2006/0195379 | A1 | 8/2006 | Abecassis et al. | |
| 2006/0248016 | A1* | 11/2006 | Ginter | G06F 21/00 705/54 |
| 2006/0271460 | A1 | 11/2006 | Hanif | |
| 2007/0100967 | A1* | 5/2007 | Smith | G06F 8/20 709/219 |
| 2007/0271234 | A1 | 11/2007 | Ravikiran | |
| 2008/0281472 | A1* | 11/2008 | Podgorny | G05B 15/02 700/276 |
| 2009/0181767 | A1 | 7/2009 | Feng | |
| 2014/0120511 | A1* | 5/2014 | Hall | G09B 5/14 434/350 |
| 2015/0019273 | A1* | 1/2015 | Grosz | G06Q 50/01 705/5 |
| 2015/0033305 | A1* | 1/2015 | Shear | G06F 21/53 726/6 |
| 2015/0058148 | A1* | 2/2015 | Grosz | G06Q 30/0283 705/26.2 |

FOREIGN PATENT DOCUMENTS

| | | |
|---|---|---|
| CN | 101515358 | 8/2009 |
| JP | 2007226794 | 9/2007 |
| JP | 2013257858 | 12/2013 |
| JP | 2014217486 | 11/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Search Report and Written Opinion of the Intellectual Property Office of Singapore issued in Singapore Application No. 11201709831T dated Jul. 9, 2018; 12 pages.
Second Written Opinion of the Intellectual Property Office of Singapore issued in Singapore Application No. 11201709831T dated Sep. 26, 2019, 4 pages.

* cited by examiner

FIG. 4

COMMUNICATION TOOL FOR DATA TRANSFER

This application is a continuation of PCT Application No. PCT/CN2016/084605, filed on Jun. 3, 2016, which claims priority to Chinese Patent Application No. 201510316622.X, filed on Jun. 10, 2015, and each application is incorporated by reference in its entirety.

BACKGROUND

Numerous users around the world are using software that enables them to be alerted when friends, family, and colleagues go on-line for real-time exchange of messages. A commonly used term for the software that enables real-time exchange of text messages, audio messages and videos is instant messaging (IM). IM software can be used at a low-cost, with most vendors giving away the product/service and others charging nominal licensing fees. IM software generally allows users to exchange messages in one window without interrupting a task in progress in another window; for example, looking over a document. Users (for example, team members) in different locations can use IM software to set up conversations and exchange information with each other. However, chat groups in existing IM software have limited functions, and user satisfaction is not high. Particularly, IM software does not usually support transmission of some particular data formats and services.

SUMMARY

Implementations of the present disclosure include computer-implemented methods for performing data transfers. In some implementations, an initiation request is received for initiating a service, where the initiation request is generated by a user of a first communication group participating in a communication session. A participation response is received from a plurality of users of the first communication group that defines a second communication group participating in the communication session. A participation result is determined that includes service conditions associated with the user of the first communication group and the plurality of users of the second communication group. In response to determining the participation result, a third communication group is generated that includes target users for completing the service.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The foregoing and other implementations can each, optionally, include one or more of the following features, alone or in combination. In particular, one implementation can include all the following features:

A first aspect, combinable with any general implementation, includes generating a fourth group including potential target users participating in a portion of the service. In a second aspect, combinable with any of the previous or following aspects, the third group is selected from the fourth group based on a service condition. In a third aspect, combinable with any of the previous or following aspects, the service condition includes ranking the fourth group to select the third group. In a fourth aspect, combinable with any of the previous or following aspects, the service includes at least one of a transfer of data and a payment. A fifth aspect, combinable with any of the previous or following aspects, includes transferring at least one of the data and funds between the one or more users of the first communication group and the third communication group. In a sixth aspect, combinable with any of the previous or following aspects, the communication tool is an instant messaging software.

The subject matter described in this specification can be implemented in particular implementations, so as to realize one or more of the following advantages. The users are enabled to complete data transfer, to complete payment, and to complete settlement of the participated projects in the communication tool. The described implementations enrich the functions of the communication tool, facilitate communication between users, beyond the limits of a communication group, and improve service completion efficiency.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes data transfer within a communication tool, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Numerous users around the world are using software that enables them to be alerted when friends, family, and colleagues go on-line for real-time exchange of messages. A commonly used term for the software that enables real-time exchange of text messages, audio messages and videos is instant messaging (IM). IM software can be used at a low-cost, with most vendors giving away the product/service and others charging nominal licensing fees. IM software generally allows users to exchange messages in one window without interrupting a task in progress in another window; for example, looking over a document. Users (for example, team members) in different locations can use IM software to set up conversations and exchange information with each other. However, chat groups in existing IM software have limited functions, and user satisfaction is not high. Particularly, IM software does not usually support transmission of some particular data formats and services.

Figure 1:
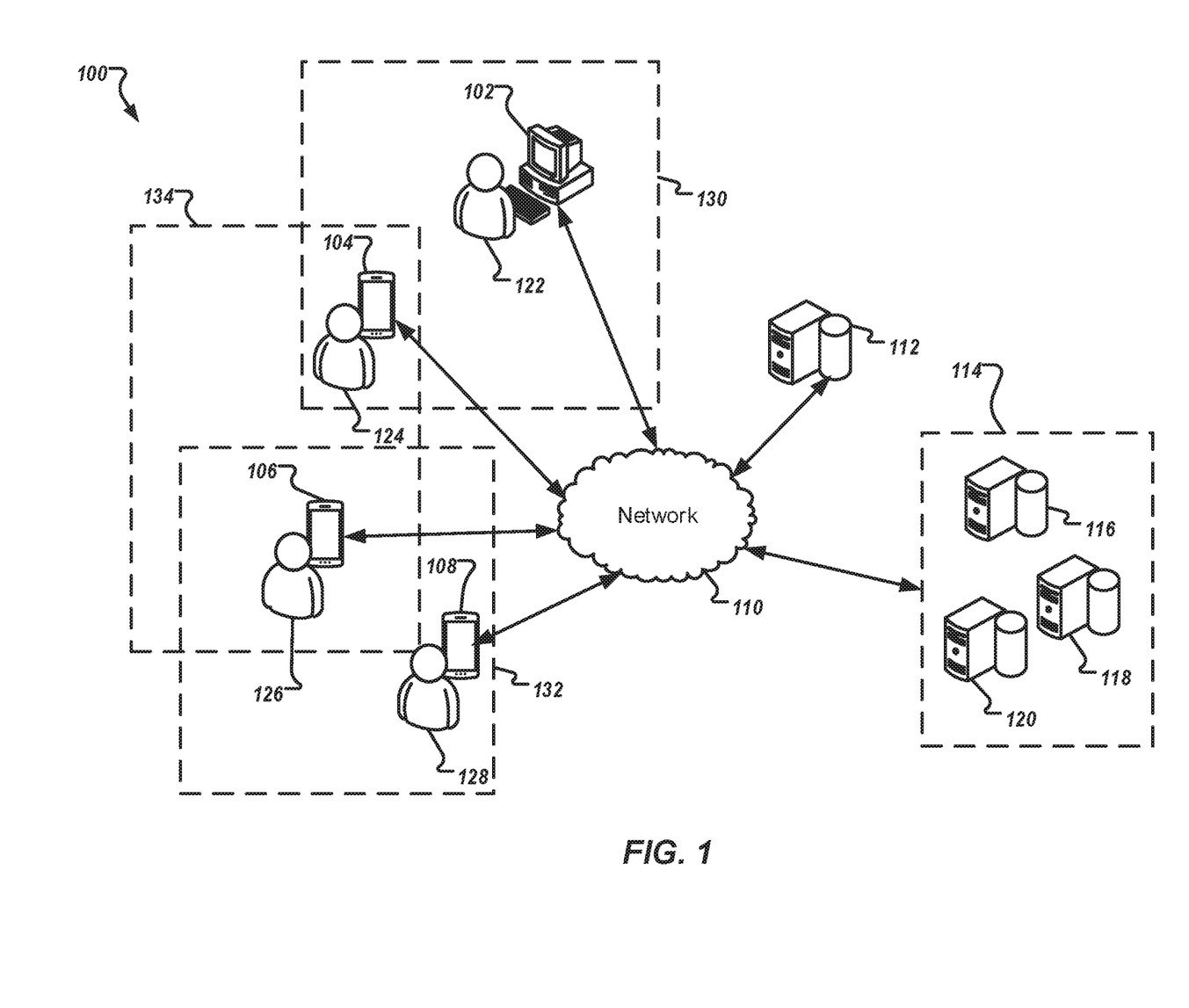
FIG. 1 is a diagram of an example of an architecture, according to an implementation of the present disclosure.

FIG. 1 depicts an example of an architecture 100 that can be used to execute implementations of the present disclosure. In the depicted example, the example architecture 100 includes client devices 102, 104, 106, 108, a network 110, a customer server system 112, and a service server system 114. Client devices 102, 104, 106, 108 can communicate with the server systems 112, 114 through the network 110. The service server system 114 includes one or more server devices 116, 118, 120. In the depicted example, users 122, 124, 126, 128 interact with the client devices 102, 104, 106, 108.

The users 122, 124, 126, 128 can interact with the client devices 102, 104, 106, 108 during multiple sessions. During each session, the users 122, 124, 126, 128 can communicate with each other by simultaneously using a communication tool, such as an instant messaging (IM) software.

In an example context, the users 122, 124 can form a first communication group 130 and users 126, 128 can form a second communication group 132 during simultaneous communication sessions. The communication groups include multiple users (members) that are each capable of performing communication that is visible to all the users of the communication group. The two communication groups can use a communication software provided by customer server system 112. User of the first communication group 130 (for example, user 124 of the client device 104) can request initiation of a service (for example, data transfer or payment). The service can be requested for users within the same communication group 130 or multiple communication groups using the same communication tool and simultaneously open to communication with the first communication group 130. A service can enable participation of a user of the second communication group 132 (for example, user 126 of the client device 106). The customer server system 112 can receive the initiation requests that are used for initiating the service (for example, data transfer projects). The customer server system 112 can send participation invitations to the other session participating users in the session, and provide participation conditions in the participation invitations.

The customer server system 112 (for example, a communication tool server) can generate participation results based on the responses received from the users (for example users 124, 126). In some implementations, the participation results are randomly generated or generated according to the user responses of the users associated with the service (for example, data transfer projects), as described in detail with reference to FIG. 2. The customer server system 112 can send the participation results to the service server system 114.

The service server system 114 (for example, a data transfer server or a payment server) is configured to receive participation results indicating the users, the communication groups (for example, the first communication group 130 and the second communication group 132) and the corresponding service. The service server system 114 can select a third communication group 134 as target data points from the pre-established communication groups 130, 132 according to the participation results and preset conditions, the number of users 124, 126 within the third communication group being a positive integer. The service server system 114 is configured to perform the service using the third communication group, as described in detail with reference to FIG. 3. In some implementations, the service server system 114 can generate a result to be displayed based on the participation results, and transmit the result to the respective client devices (for example, client devices 104, 106) for display. The users (for example, users 124, 126) can view the participation results of the associated service (for example, data transfer projects).

Figure 2:
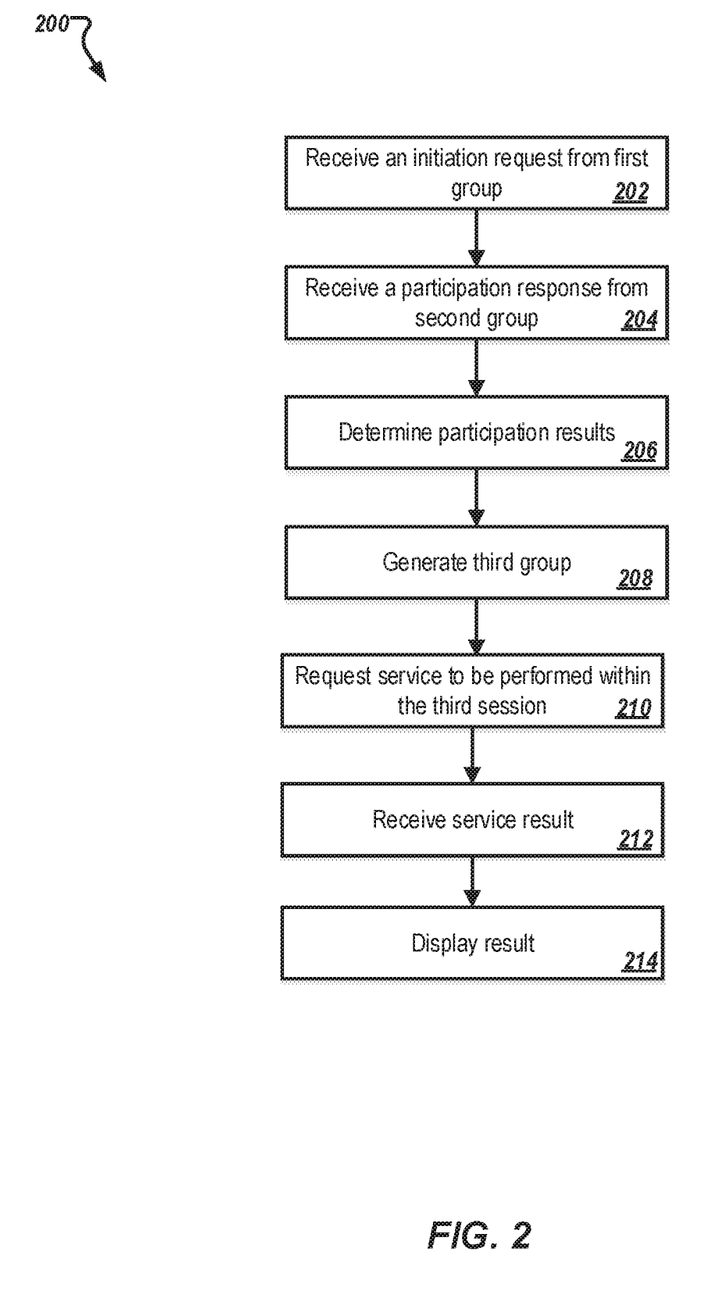
FIG. 2 is a flowchart illustrating an example of a method for performing a service using a communication tool, according to an implementation of the present disclosure.

FIG. 2 is a flowchart illustrating an example of a method 200 for performing a service using a communication tool, according to an implementation of the present disclosure. Method 200 can be implemented as one or more computer-executable programs executed using one or more computing devices, as described with reference to FIGS. 1 and 4. In some implementations, various steps of the example method 200 can be run in parallel, in combination, in loops, or in any order.

At 202, a customer server system receives initiation requests that are used for initiating a service (for example, data transfer projects or payment projects). The initiation requests are received from a first number (M) of session participating users that are part of a first communication group. The first number of session participating users is a positive integer. The first number of session participating users can be 1 or a positive integer greater than 1. The first communication group uses a communication tool (for example, IM software) to communicate. The communication tool can be configured to provide through a graphical user interface displayed by client devices, a feature selectable by users to initiate a service request. For example, the graphical user interface can include a button to initiate a project, and a selection of the button automatically triggers generation of the initiation request.

The communication tool can be configured to support multiple types of services, including data transfer and payments. Data transfer services can include any type of data transfer associated to group operations. The group operations can include a competition between two or more users of the communication tool. Data transfer services can include auctions that lead to transfer of data, such as bonus points or virtual currency. Within the example context of auctions, users in a chat group of the IM software can initiate auctions according to a set of requirements presented to users during usage of IM software. A customer server providing the IM software receives auction initiation requests from one or more users in the chat group (for example, a user A and a user B). The customer server providing the IM software checks the service conditions (for example, whether the user A or the user B satisfies an essential condition for initiating an auction project by a user). If it is determined by checking that the user A does not satisfy the auction initiation condition, an alert (for example, an error prompt) is generated and transmitted to the client device. The client device displays the alert on the interface of the IM software. If the user B satisfies the initiation condition, an auction is initiated according to the initiation request from the user B. In response to confirming the user B, the other session participating users in the first chat group can view the service (auction) initiated by the user B. In some implementations, after the customer server system receives the initiation requests and successfully creates the service (for example, an auction project), the customer server system can send participation invitations to the other session participating users in the session, and mark participation conditions in the participation invitations.

In response to receiving the initiation request, the customer server system can display information associated to the service and activate a feature of the communication tool to enable users from one or more communication groups to join the initiated service. For example, in response to successfully initiating the service (for example, data transfer project(s)), the customer server system can send service related information to the client devices of the other session participating users. The service related information is displayed in a chat group corresponding to the communication tool of the session participating users. The nicknames of the participating users initiating the service (for example, data transfer project(s)) are displayed in the chat group of the communication tool. The participation conditions are marked in the chat group, such that users of other communication groups (for example, a second communication group) with ongoing sessions are enabled to determine, according to the participation conditions, whether to take part in the service (for example, data transfer project(s)). The second communication group is different from the first communication group, such that the two communication groups are formed of different users. From 202, method 200 proceeds to 204.

At 204, the customer server system receives participation responses from a second number (N) of multiple session participating users that request participation in the service. The second number of session participating users is a positive integer. The second number of session participating users can be 1 or a positive integer greater than 1 that is smaller or equal to the total number of users within the second communication group. The customer server system transmits participation responses and service information to the service server system. From 204, method 200 proceeds to 206.

At 206, the service server system processes the participation responses and service information to determine participation results for the service. The participation results for the service can include service conditions corresponding to each of the users who generated the service request and transmitted participation responses. The participation results can be randomly generated or generated based on the content input and one or more conditions associated to the users participating in the service (for example, data transfer projects). From 206, method 200 proceeds to 208.

At 208, the service server system generates a third communication group including a third number (Q) of users that include potential target data points (intermediate data points) to perform the service. The third communication group includes users from the first and second communication groups, according to the participation results and preset conditions. The third number (Q) of users is a positive integer. The preset conditions are set by the service server system for the service (for example, data transfer projects) and are related to the service (for example, data transfer projects). The service server system sets different preset conditions for different service types.

Within the context example of the service including an auction project, the service server system may set a condition for the auction project as that the auctioned item is sold to the participating user offering the highest bid, and select the session participating user initiating the auction as the target data point. Assuming that only one user (such as, user A) initiates an auction project, user A is the source data point. Assuming that three users (such as, users B, C, and D) from a second communication group take part in the auction project initiated by the user A, users B, C, and D are defined by the service server system as potential target data points. The service server system acquires participation results of the four users taking part in the auction project. A preset condition can be stored in the service server system. The preset condition for the auction project can include a question as to whether the auctioned item is sold to the participating user offering the highest bid. If it is determined, according to the participation results of the auction project, that the user B offers the highest bid, the service server system selects the account of the user B as the target data point. From 208, method 200 proceeds to 210.

At 210, the service server system completes the service, as described with reference to FIG. 3. In response to completing the service, the service server system can generate service result and transmit the service results to the customer server system. The service result can include one or more of a confirmation of an outcome of a service, an identifier of the service, an identifier of the source data point, and an identifier of the target data point. From 210, method 200 proceeds to 212.

At 212, the customer server system receives the service result. The customer server system transmits the service result to the client devices (for example, the client devices of the source data point and the target data point). From 216, method 200 proceeds to 214.

Within another context example of a service type including payment for a trip project, a user A in a first communication group of IM software initiates the trip project. The trip project includes information about the location, gathering time, scenic spots, and associated expenses per user. In response to generating the trip project, a joining button is displayed by the communication tool. It is assumed that users C, D, and E accept participation in the weekend trip project initiated by the user A. The customer server system retrieves participation conditions of the users and forwards the corresponding participation conditions to the service server system. The service server system determines the participation results of the weekend trip project initiated by the user A and defines the account of the user A as a target account according to the participation results and a preset condition. The service server system generates a payer matching list of the user A, payer matching lists of the users C, D, and E, and a payee matching list of the user A. The service server system deducts payments from the accounts of the participating users C, D, and E. The service server system deposits deducted payments into the account of the user A according to the payer matching lists and the payee-matching list. The users are enabled to define projects, share projects and complete services (for example, payment) in the communication tool. The service related features of the communication tool enrich the functions of the communication tool, facilitating a variety of services and improving communication efficiency.

At 214, the client devices of the users initiating the service request and the users defined as target data points display the service result and enable the users to generate a user input associated with completion of the service. After 214, method 200 stops.

Figure 3:
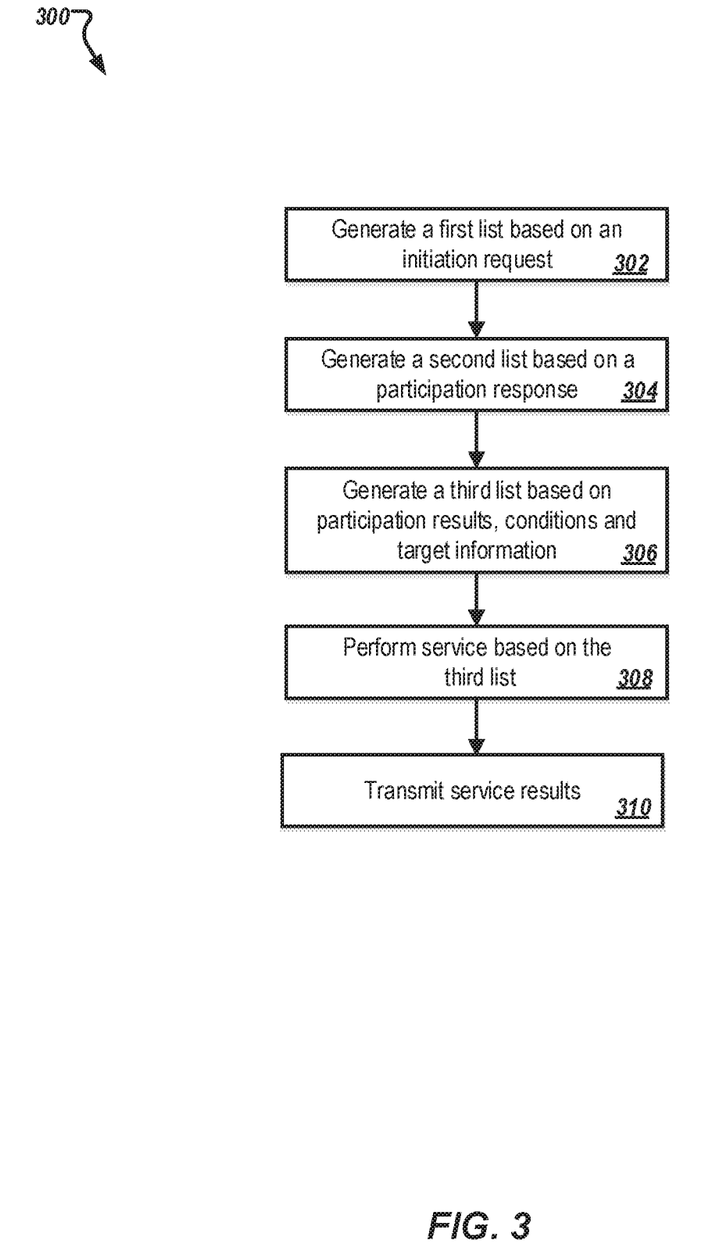
FIG. 3 is a flowchart illustrating an example of another method for performing a service using a communication tool, according to an implementation of the present disclosure.

FIG. 3 is a flowchart illustrating an example of a method 300 for performing a service using a communication tool, according to an implementation of the present disclosure. Method 300 can be implemented as one or more computer-executable programs executed using one or more computing devices, as described with reference to FIGS. 1 and 4. In some implementations, various steps of the example method 300 can be run in parallel, in combination, in loops, or in any order.

At 302, a service server system generates a first list based on a request to initiate a service using a communication tool, the request being received from a customer server system. The first list includes one or more source data points corresponding to users of a first communication group requesting a service by using a communication tool. From 302, method 300 proceeds to 304.

At 304, the service server system processes participation responses to generate a second list. The second list includes one or more potential target data points (intermediate data points) corresponding to users of a second communication group interested in performing the service by using a communication tool. The second list is configured to point from source data points to the target data points (intermediate data points). From 304, method 300 proceeds to 306.

At 306, the service server system processes participation results and the preset conditions to generate a third list including one or more target data points. For example, the service server system can rank the users corresponding to the target data points according to the participation results. The ranking can be used to allocate service parameters (for example, data transfer amounts) to the target data points according to the preset conditions and the ranking results. The ranking can be used to generate the third data transfer lists according to the target data points and the data transfer amounts respectively allocated to the target data points. From 306, method 300 proceeds to 308.

At 308, the service server system performs the service for the users included in the third list. For a data transfer service type, the service server system performs data export for data points of selected users of the first list and performs data import to the target data points according to the third list. For a payment service type, the service server system performs funds relocation between users of different lists, such as from users of the third list to users of the first list.

A data transfer service can include allocation of bonus points, virtual currencies and the like for competing activities performed within an IM communication environment. Within the context example of allocation of bonus points, multiple users of the IM communication, distributed through multiple communication groups, can compete for the bonus points by solving riddles. For example, four users (such as, users A, B, C, and D) can each spend 10 bonus points to take part in the project of solving riddles with bonus points to be distributed based on results to one or more winners. It is assumed that there are altogether 10 riddles and the users contest against each other to try to solve the riddles first. The participation results of the riddle-solving project acquired by the service server system can include that the user A solves two riddles, the user B solves three riddles, the user C solves four riddles, and the user D solves one riddle. It is assumed that the preset condition used by the service server system for the riddle-solving project is that: the user solving the most riddles is awarded 60% of the bonus points and the user solving the second most riddles is awarded 40% of the bonus points. Processing the results based on the preset condition, the service server system defines the third list as including users B and C. The service server system performs the service for the users included in the third list by allocating 24 bonus points to the user C and allocating 16 bonus points to the user B from the funds generated by collecting bonus points from all four participants (such as, users A, B, C, and D). From 308, method 300 proceeds to 310.

At 310, the service server system transmits the service results to the client device. The client device displays the service results and enables a user to generate a user input to apply the service results. After 310, method 300 stops.

Figure 4:
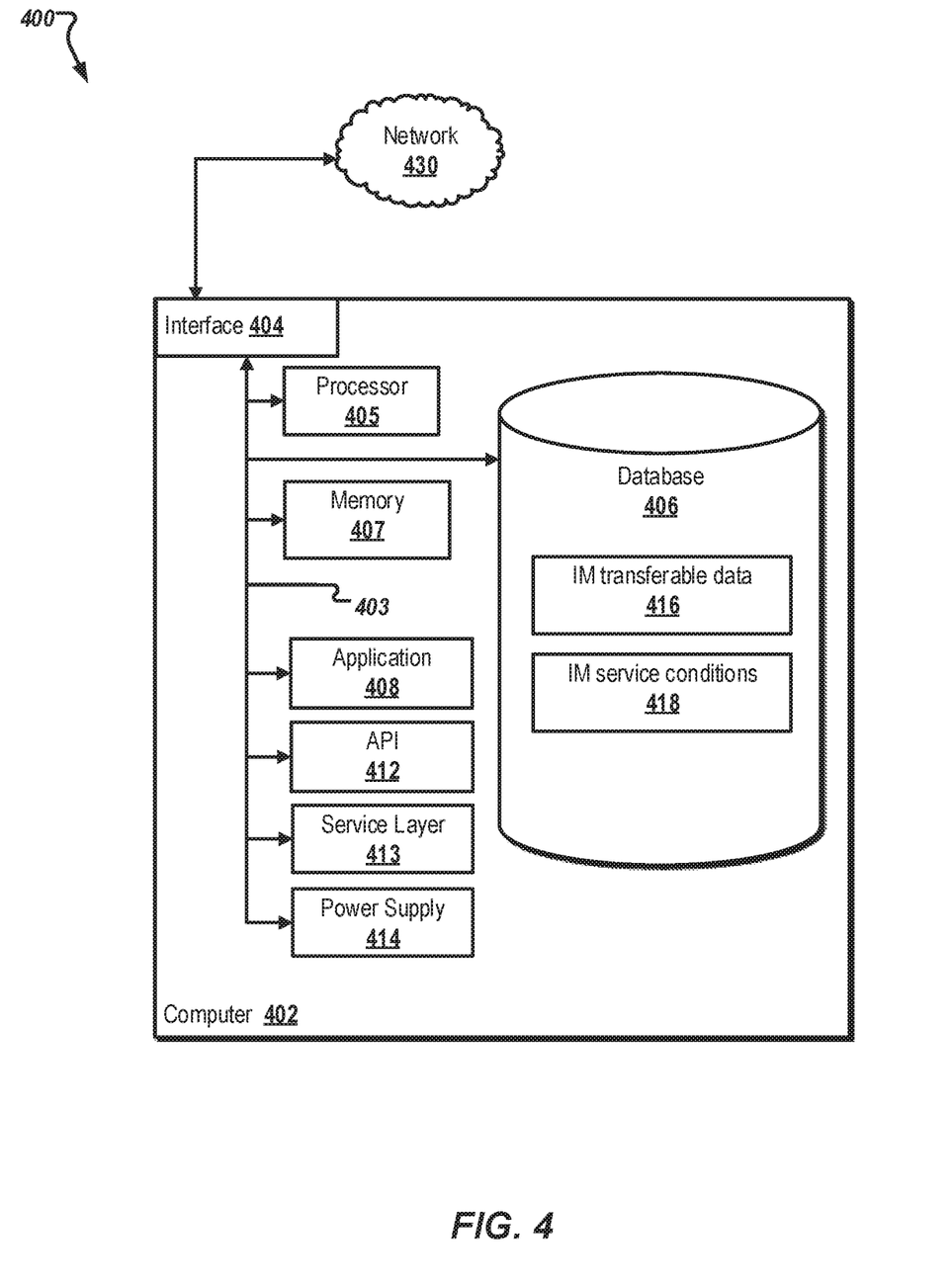
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the database 406 holds previously described IM transferable data 416 (for example, virtual currency, bonus points) and IM service conditions 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method for data transfer that is executed by one or more processors includes: receiving, by the one or more processors, an initiation request for initiating a service, the initiation request being generated by a user of a first communication group participating in a communication session, receiving, by the one or more processors, a participation response from a plurality of users of the first communication group defining a second communication group participating in the communication session, determining, by the one or more processors, a participation result including service conditions associated with the user of the first communication group and the plurality of users of the second communication group, and in response to determining the participation result, generating, by the one or more processors, a third communication group including target users for completing the service.

The foregoing and other described implementations can each, optionally, include one or more of the following features:

A first feature, combinable with any of the following features, includes generating a fourth group including potential target users participating in a portion of the service.

In a second feature, combinable with any of the previous or following features, the third group is selected from the fourth group based on a service condition.

In a third feature, combinable with any of the previous or following features, the service condition includes ranking the fourth group to select the third group.

In a fourth feature, combinable with any of the previous or following features, the service includes at least one of a transfer of data and a payment.

A fifth feature, combinable with any of the previous or following features, includes transferring at least one of the data and funds between the one or more users of the first communication group and the third communication group.

In a sixth feature, combinable with any of the previous or following features, the communication tool is an instant messaging software.

In a second implementation, a non-transitory, computer-readable medium storing one or more instructions executable by a computer system to perform operations includes: receiving an initiation request for initiating a service, the initiation request being generated by a user of a first communication group participating in a communication session, receiving a participation response from a plurality of users of the first communication group defining a second communication group participating in the communication session, determining a participation result including service conditions associated with the user of the first communication group and the plurality of users of the second communication group, and in response to determining the participation result, generating a third communication group including target users for completing the service.

The foregoing and other described implementations can each, optionally, include one or more of the following features:

A first feature, combinable with any of the following features, includes generating a fourth group including potential target users participating in a portion of the service.

In a second feature, combinable with any of the previous or following features, the third group is selected from the fourth group based on a service condition.

In a third feature, combinable with any of the previous or following features, the service condition includes ranking the fourth group to select the third group.

In a fourth feature, combinable with any of the previous or following features, the service includes at least one of a transfer of data and a payment.

A fifth feature, combinable with any of the previous or following features, includes transferring at least one of the data and funds between the one or more users of the first communication group and the third communication group.

In a sixth feature, combinable with any of the previous or following features, the communication tool is an instant messaging software.

In a third implementation, a computer-implemented system for data transfer, includes: one or more computers, and one or more computer memory devices interoperably coupled with the one or more computers and having tangible, non-transitory, machine-readable media storing instructions that, when executed by the one or more computers, perform operations that include: receiving an initiation request for initiating a service, the initiation request being generated by a user of a first communication group participating in a communication session, receiving a participation response from a plurality of users of the first communication group defining a second communication group participating in the communication session, determining a participation result including service conditions associated with the user of the first communication group and the plurality of users of the second communication group, and in response to determining the participation result, generating a third communication group including target users for completing the service.

The foregoing and other described implementations can each, optionally, include one or more of the following features:

A first feature, combinable with any of the following features, includes generating a fourth group including potential target users participating in a portion of the service.

In a second feature, combinable with any of the previous or following features, the third group is selected from the fourth group based on a service condition.

In a third feature, combinable with any of the previous or following features, the service condition includes ranking the fourth group to select the third group.

In a fourth feature, combinable with any of the previous or following features, the service includes at least one of a transfer of data and a payment.

A fifth feature, combinable with any of the previous or following features, includes transferring at least one of the data and funds between the one or more users of the first communication group and the third communication group.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for data transfer, the method being executed by one or more processors and comprising:

receiving, by the one or more processors, an initiation request for initiating a service, the initiation request being generated by a user of a first communication group of a plurality of communication groups participating in a communication session using a communication tool;

receiving, by the one or more processors, a participation response from a plurality of users of the plurality of communication groups different from the first communication group, the plurality of users being included in a second communication group to which the user of the first communication group does not belong and each of the plurality of users in the second communication group is participating in the communication session, uses the communication tool and is open to communicate with the user of the first communication group;

determining, by the one or more processors, a participation result comprising service conditions associated with the user of the first communication group and the plurality of users of the second communication group; and in response to determining the participation result, generating, by the one or more processors, a third communication group comprising target users for completing the service.

2. The computer-implemented method of claim 1, further comprising generating, by the one or more processors, a third group and a fourth group comprising potential target users participating in a portion of the service.

3. The computer-implemented method of claim 2, wherein the third group is selected from the fourth group based on a service condition.

4. The computer-implemented method of claim 3, wherein the service condition comprises ranking the fourth group to select the third group.

5. The computer-implemented method of claim 1, wherein the service comprises at least one of a transfer of data and a payment.

6. The computer-implemented method of claim 5, further comprising transferring at least one of the data and funds between one or more users of the first communication group and the third communication group.

7. The computer-implemented method of claim 1, wherein the communication tool is an instant messaging software.

8. A non-transitory, computer-readable medium storing one or more instructions executable by a computer system to perform operations comprising:

receiving an initiation request for initiating a service, the initiation request being generated by a user of a first communication group of a plurality of communication groups participating in a communication session using a communication tool;

receiving a participation response from a plurality of users of the plurality of communication groups different from the first communication group, the plurality of users being included in a second communication group to which the user of the first communication group does not belong and each of the plurality of users in the second communication group is participating in the communication session, uses the communication tool and is open to communicate with the user of the first communication group;

determining a participation result comprising service conditions associated with the user of the first communication group and the plurality of users of the second communication group; and in response to determining the participation result, generating a third communication group comprising target users for completing the service.

9. The non-transitory, computer-readable medium of claim 8, further comprising generating a third group and a fourth group comprising potential target users participating in a portion of the service.

10. The non-transitory, computer-readable medium of claim 9, wherein the third group is selected from the fourth group based on a service condition.

11. The non-transitory, computer-readable medium of claim 10, wherein the service condition comprises ranking the fourth group to select the third group.

12. The non-transitory, computer-readable medium of claim 8, wherein the service comprises at least one of a transfer of data and a payment.

13. The non-transitory, computer-readable medium of claim 12, further comprising transferring at least one of the data and funds between one or more users of the first communication group and the third communication group.

14. The non-transitory, computer-readable medium of claim 8, wherein the communication tool is an instant messaging software.

15. A computer-implemented system for data transfer, comprising:

one or more computers; and one or more computer memory devices interoperably coupled with the one or more computers and having tangible, non-transitory, machine-readable media storing instructions that, when executed by the one or more computers, perform operations comprising:

receiving an initiation request for initiating a service, the initiation request being generated by a user of a first communication group of a plurality of communication groups participating in a communication session using a communication tool;

receiving a participation response from a plurality of users of the plurality of communication groups different from the first communication group, the plurality of users being included in a second communication group to which the user of the first communication group does not belong and each of the plurality of users in the second communication group is participating in the communication session, uses the communication tool and is open to communicate with the user of the first communication group;

determining a participation result comprising service conditions associated with the user of the first communication group and the plurality of users of the second communication group; and in response to determining the participation result, generating a third communication group comprising target users for completing the service.

16. The computer-implemented system of claim 15, further comprising generating a third group and a fourth group comprising potential target users participating in a portion of the service.

17. The computer-implemented system of claim 16, wherein the third group is selected from the fourth group based on a service condition.

18. The computer-implemented system of claim 17, wherein the service condition comprises ranking the fourth group to select the third group.

19. The computer-implemented system of claim 15, wherein the service comprises at least one of a transfer of data and a payment.

20. The computer-implemented system of claim 19, further comprising transferring at least one of the data and funds between one or more users of the first communication group and the third communication group.

* * * * *